United States Patent
Bach et al.

(10) Patent No.: US 9,535,425 B2
(45) Date of Patent: Jan. 3, 2017

(54) FAN AIRFLOW MONITORING SYSTEM IN AN APPLIANCE

(75) Inventors: James Carter Bach, Seymour, IN (US); Ashley Wayne Burt, Louisville, NY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 795 days.

(21) Appl. No.: 13/473,191

(22) Filed: May 16, 2012

(65) Prior Publication Data
US 2013/0309958 A1 Nov. 21, 2013

(51) Int. Cl.
- F24F 11/04 (2006.01)
- G05D 7/06 (2006.01)
- G05D 23/19 (2006.01)
- F24F 11/00 (2006.01)

(52) U.S. Cl.
CPC ............ G05D 7/0682 (2013.01); G05D 23/19 (2013.01); F24F 2011/0038 (2013.01)

(58) Field of Classification Search
CPC ................ F24F 2011/0038; F24F 11/00; F24F 2011/0002; F24F 2011/0042; F24F 2011/0064; F24F 2011/0091; G05D 7/0682; G05D 23/19; A21B 3/00; F24C 15/002; F24C 15/006; F24C 15/2007; F24C 15/2021; F24C 15/322

USPC .................... 454/61, 49, 255, 256, 306, 324
See application file for complete search history.

(56) References Cited

U.S. PATENT DOCUMENTS

| | | | | |
|---|---|---|---|---|
| 3,051,161 A | * | 8/1962 | Hicks | 126/110 R |
| 3,889,099 A | * | 6/1975 | Nuss | 219/393 |
| 4,373,504 A | * | 2/1983 | Day | 126/21 A |
| 4,392,038 A | * | 7/1983 | Day et al. | 219/738 |
| 6,319,114 B1 | | 11/2001 | Nair et al. | |
| 6,772,752 B1 | * | 8/2004 | Boyer | 126/21 A |
| 7,343,850 B2 | * | 3/2008 | Gerl | F24C 15/2007 |
| | | | | 219/401 |
| 2002/0040902 A1 | * | 4/2002 | Brown et al. | 219/681 |
| 2008/0113609 A1 | * | 5/2008 | Ehlers | 454/241 |

* cited by examiner

*Primary Examiner* — Gregory Huson
*Assistant Examiner* — Dana Tighe
(74) *Attorney, Agent, or Firm* — Dority & Manning, P.A.

(57) ABSTRACT

An independent monitoring system and method for measuring the airflow rate in an appliance and determining its sufficiency is provided. An airflow detection system that monitors airflow rate (velocity) in an appliance is separate from the primary appliance control system and can determine whether a sufficient flow of air through air passageways occurs during operation of the appliance. An appliance component or subsystem can be controlled (e.g. activated or deactivated) by the airflow monitoring system based on the detected airflow rate.

20 Claims, 10 Drawing Sheets

FAN AIRFLOW MONITORING SYSTEM IN AN APPLIANCE

FIELD OF THE INVENTION

The subject matter of the present disclosure generally relates to appliances, and more particularly, to a system and method of independently monitoring the airflow rate in a pathway of an appliance, determining if the airflow rate is sufficient for the operating mode of the appliance, and performing one or more remedial actions if the airflow rate is insufficient.

BACKGROUND OF THE INVENTION

Appliances that generate heat need a means to regulate internal temperature for adequate overall operation of the appliance. Cavities, passages, or ducts are frequently provided to direct air flow and to cool the appliance. Some appliances have conventionally relied upon natural convection to provide movement of air through ducts to cool the appliance. For example, the higher the expected temperature, the larger the size of the duct and inlet/exhaust ports.

However, the space provided for the ducts usually comes at the expense of space needed for general operation of the appliance. For example, in an oven, the overall size is generally standardized due to cabinet size, etc. By increasing the size of the ducts, the size of the cooking chamber is reduced.

As a result, a fan or blower can be provided to force air through the ducts or ventilation system of the appliance. Incorporating forced air ventilation into the appliance improves the cooling and temperature regulation within the appliance. However, it is important to ensure that the fan or blower is operating properly, that is, producing sufficient airflow, to provide adequate ventilation.

Generally, monitoring the power supplied to the fan is inadequate to determine if proper ventilation of the appliance is taking place. Likewise, using a tachometer system to measure the fan's rotational speed (RPM) can be inadequate to properly determine an actual airflow rate through the appliance. An appliance's controller can determine the amount of current used to run the fan, or measure the speed (RPM) of the motor by a variety of means, but other factors can influence the actual rate of airflow such as clogged or blocked ducts/vents or a stuck rotor shaft/impeller. For example, in the situation of clogged or blocked ducts/vents, the fan will continue to essentially operate normally (the RPM may be slightly higher) and the current detected by the device controller remains relatively unchanged (the current may drop slightly), but because the duct/vent is blocked, there is a reduced airflow provided to the appliance, and portions of the appliance might operate hotter than intended. Without adequate cooling regulation in the appliance, damage may occur to the appliance components, such as control electronics, circuitry, or other components and the life of the affected components may be reduced.

Accordingly, an appliance having a fan that provides for proper and adequate cooling during operation of the device would be useful. Such an appliance that includes an autonomous or separate and independent (aka autonomous) system for determining whether a sufficient flow of air is present would also be beneficial. An appliance capable of taking remedial action in the event the separate system detects that the flow of air is insufficient for properly cooling the device would also be particularly useful.

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to an appliance having an air passageway defined in the appliance, where the air passageway can direct circulating air through at least part of the appliance. A fan in communication with the air passageway can also be included in the appliance, where the fan can selectively cause air to circulate through the air passageway at an airflow rate. The appliance can further include an appliance control system can control a speed of the fan based on an operating mode of the appliance and an airflow monitoring system in communication with the air passageway. The airflow monitoring system can autonomously control a subsystem of the appliance based on the airflow rate within the air passageway. For this embodiment, the appliance control system and the airflow monitoring system are both operably coupled to the subsystem of the appliance.

Another exemplary aspect of the present disclosure is directed to a method of controlling an appliance based on a rate of airflow. The method can include monitoring the rate of airflow circulating through an air passageway at an airflow monitoring system, where a fan circulates air through the air passageway at the rate of airflow based on commands from an appliance control system according to an appliance operating mode; and autonomously controlling a subsystem of the appliance based on the rate of airflow using an airflow monitoring system, where the appliance control system and the airflow monitoring system are both operably coupled to the subsystem of the appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

The present disclosure relates to a system and method for autonomously measuring the airflow within an appliance, making a determination of airflow sufficiency, and providing remedial action(s) when insufficient airflow is present. A supervisory airflow monitoring system that measures airflow rate in an appliance can be separate from an appliance's primary control system and can determine whether a sufficient flow of air through ventilation passages occurs during operation. An appliance subsystem (e.g. a heating element, a motor, etc.) can be controlled by the airflow monitoring system based on the detected airflow rate. Remedial action(s) can be taken if the airflow detection system detects inadequate airflow.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
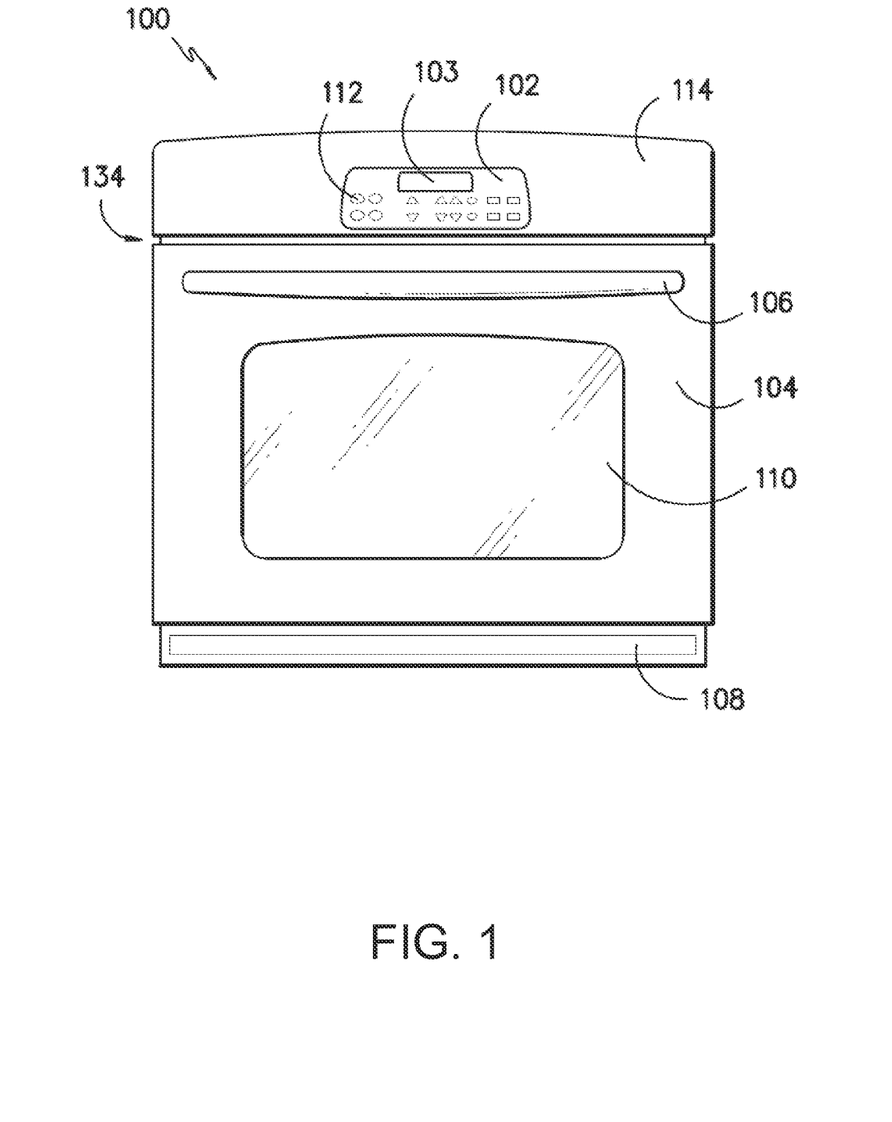
FIG. 1 illustrates a front view of an exemplary embodiment of an oven as according to an exemplary embodiment of the present disclosure.
Figure 2:
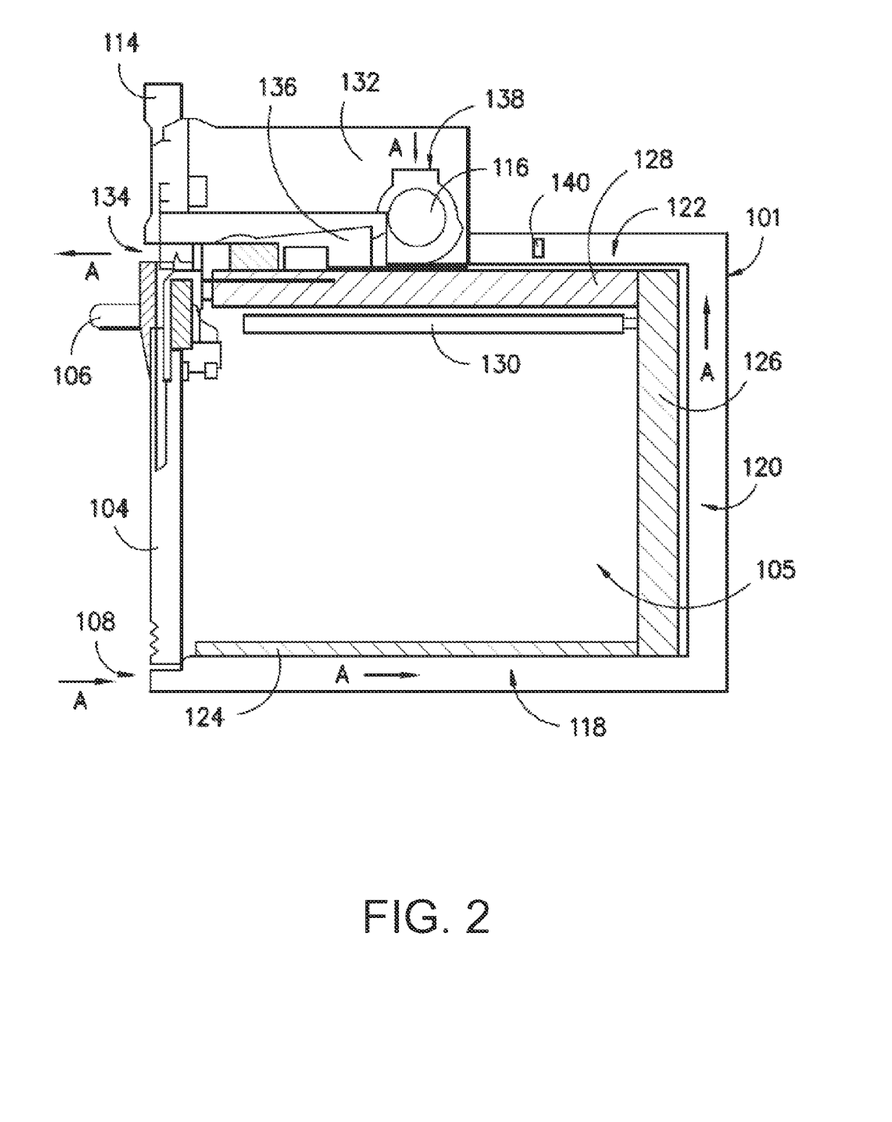
FIG. 2 provides a cross-sectional view of the exemplary embodiment of FIG. 1.

Referring to FIGS. 1 and 2, an exemplary embodiment of an oven 100 according to the present disclosure is shown. The system and method disclosed herein are not limited to use with ovens and may be used with other appliances having a fan or blower such as e.g., clothes dryers, air conditioners, refrigerators, space heaters, dehumidifiers, humidifiers, range hoods, bathroom fans, furnace, etc.

FIG. 1 provides a front view of oven 100 while FIG. 2 provides a cross-sectional view. Oven 100 includes a door 104 with handle 106 that provides for opening and closing access to a cooking chamber 105. A user of the appliance 100 can place a variety of different items to be cooked into chamber 105. A heating element 130 at the top of chamber 105 provides a heat source for cooking Heating element 130 can be any type of heating element such as gas, electric, microwave, or a combination thereof. Other heating elements could be located at the bottom of chamber 130 as well. Racks (not shown) in chamber 105 can be used to position food items to be cooked at various levels within the oven. A window 110 on door 104 allows the user to view e.g., food items during the cooking process.

Oven 100 includes a user interface 102 having a display 103 positioned on a top panel 114 with a variety of controls 112. Interface 102 allows the user to select various options for the operation of oven 100 including e.g., temperature, time, and/or various cooking and cleaning cycles. Operation of oven appliance 100 can be regulated by a device controller (not shown) that is operatively coupled i.e., in communication with, user interface panel 102, heating element 130, and other components of oven 100 as will be further described.

For example, in response to user manipulation of the user interface panel 102, the controller can operate heating element 130. The controller can receive measurements from a temperature sensor (not shown) placed in cooking chamber 105 and e.g., provide a temperature indication to the user with display 103. The controller can also be provided with other features as will be further described herein.

By way of example, any/all of the "controllers" discussed in this disclosure, whether the appliance control system or the airflow monitoring controller, may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, the controller might also be constructed without using a microprocessor, using a combination of discrete analog and/or digital logic circuitry (such as amplifiers, integrators, comparators, flip-flops, AND gates, and the like) to perform the oven control functionality instead of relying upon software.

The various controllers discussed within this disclosure may be positioned in a variety of locations throughout appliance 100. In the illustrated embodiment, the primary appliance controller may be located under or next to the user interface 102 otherwise within top panel 114. In such an embodiment, input/output ("I/O") signals are routed between the controller and various operational components of appliance 100 such heating element 130, controls 112, display 103, sensor(s), alarms, and/or other components as may be provided. In one embodiment, the user interface panel 102 may represent a general purpose I/O ("GPIO") device or functional block.

Although shown with touch type controls 112, it should be understood that controls 112 and the configuration of appliance 100 shown in FIG. 1 is provided by way of example only. More specifically, user interface 102 may include various input components, such as one or more of a variety of electrical, mechanical or electro-mechanical input devices including rotary dials (knobs), push buttons, toggle/rocker switches, and touch pads. The user interface 102 may include other display components, such as a digital or analog display device designed to provide operational feedback to a user. The user interface 102 may be in communication with the controller via one or more signal lines or shared communication busses. Also, oven 100 is shown as a wall oven but the present disclosure could also be used with other appliances such as e.g., a stand-alone oven, an oven with a cook top (aka a stove or a range) and other configurations as well.

As stated, during operation of oven 100 in both cooking and cleaning cycles, the temperatures that are needed in chamber 105 can be high. Insulation panels 124, 126, and 128 in the bottom, rear, and top of oven 100 help minimize reduce heat transfer from oven 100 to e.g., surrounding cabinetry. Additionally, oven 100 is provided with a ventilation system whereby ambient air is used to help cool appliance 100.

More specifically, oven 100 includes air passageways 118, 120, and 122 located within the bottom, rear, and top of the cabinet 101 of oven 100. A blower or fan 116 located in cavity 132 pulls heated air into its inlet 138. This air is forced through duct 136 and exits oven 100 through vent 134 located between door 104 and top panel 114. Fan 116 pulls air from the electronics bay (enclosure) 132, which is connected with air passageways 118, 120, 122. Cooler air from the ambient is pulled into air passageway 118 through air inlet 108, which is located below door 104. The flow of air is indicated by arrows A in FIG. 2. The ventilation system described for oven 100 is provided by way of example only. As will be understood by one of skill in the art using the teachings disclosed herein, numerous other configurations may be used as well. By way of example, the flow of air could be reversed by changing the direction of operation of fan 116, causing cooler air to enter at 134 and hot air to be exhausted at 108. Different arrangements of the air passageways may also be used as well, including air passageways in the left and right sidewalls of the oven.

As previously stated, to ensure that proper ventilation occurs during operation, oven 100 is provided with an air flow measuring device 140 that is positioned within air passageway 122 for this exemplary embodiment. Device 140 could also be placed in other locations as well including e.g., air passageways 118 and 120. Although shown mounted upstream of fan 116 in terms of air flow A, device 140 could also be located downstream of fan 116 e.g. air passageway 136. Device 140 can be used not only to determine whether air is flowing through the ventilation system of oven 100 but can also be used to determine the rate of air flow.

Figure 3:
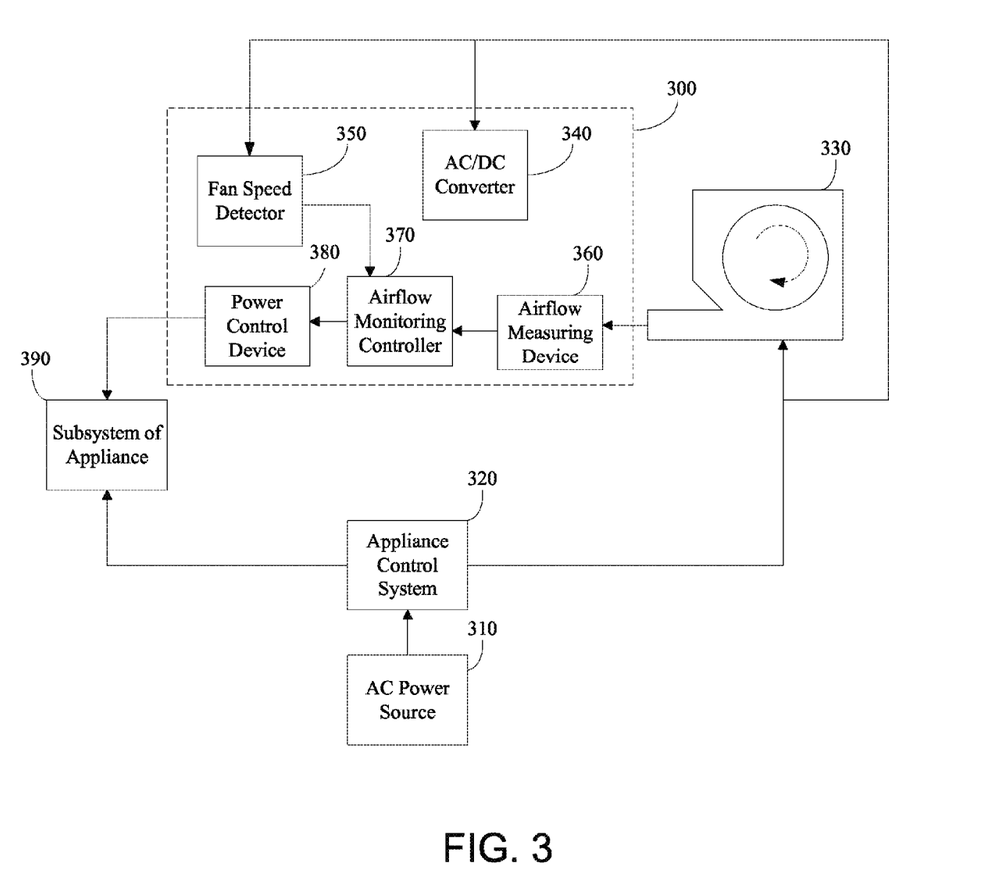
FIG. 3 provides a diagram of an exemplary airflow monitoring system of the present disclosure according to an exemplary embodiment of the present disclosure.

With reference now to FIG. 3, there is illustrated an exemplary embodiment of a schematic block diagram of an appliance including an airflow monitoring system 300. The airflow monitoring system 300 can act as a stand-alone supervisor or watchdog from the appliance control system 320. This autonomous function may allow the airflow monitoring system 300 to independently measure, calculate, and determine a course of action based on the measured airflow rate and not from direction or control from the appliance control system 320. For the purposes of this disclosure, "autonomous" can mean that an airflow monitoring system and a device controller can operate independently to disengage an appliance load. The airflow monitoring system may be completely separate from the device controller both in location as well as components. Alternatively, the airflow monitoring system may be coupled to the device controller in numerous ways, such as coupling components (e.g. signal "handshaking", data transmission, etc.), sharing power sources, etc., provided that the airflow monitoring system still maintains independence in determining airflow sufficiency and can make appliance load disengagement decisions independent from the appliance control system.

An alternating current (AC) power source 310 can provide power to the appliance control system 320. The AC power source can be a two phase, 240 volt AC power supply that is supplied to residential properties from energy production sources such as an electric utility supplier. Alternatively, other power sources can be used, such as a one phase 120V power supply, a three phase power supply, a generator, a battery, or any DC power source.

Appliance control system 320 can supply a power signal to the fan 330 to provide power and speed control indication to the fan 330. Fan 330 can operate at various speeds, such as high and low speeds. The power signal provides the fan 330 with a signal to indicate which speed to operate at for that portion of the operation cycle of the appliance. Fan speed detector 350 and AC/DC converter 340 of the airflow monitoring system 300 can be coupled to the line supplying the power and speed control signals to the fan 330, and as such the airflow monitoring system 300 is powered by the signals which control the fan. The fan speed detector 350 detects the speed at which the fan 330 is commanded by the appliance control system 320 while a AC/DC converter can use the fan's power signal to convert that signal into a DC signal to provide power to airflow monitoring controller 370 and airflow measuring device or sensor 360. Fan speed detector 350 provides a signal that indicates the detected fan speed to the airflow monitoring controller 370. The fan speed detector 350 can detect a signal indicative of a fan speed or it can detect a commanded fan speed.

After the fan 330 begins operation, airflow measuring device 360 detects the velocity or rate of the airflow from the fan 330 in an air passageway of the appliance. A signal representing the measured airflow rate is sent to the airflow monitoring controller 370. When the airflow monitoring controller 370 determines that the detected airflow is below a predetermined range or threshold value relative to the commanded fan speed, the airflow monitoring controller 370 can send a signal to the power control device (e.g. a relay or TRIAC ) 380 to disengage a subsystem of the appliance 390 (e.g. an appliance load). For example, in an oven, when it is determined that the airflow rate is sufficient for the commanded fan speed, the airflow monitoring controller 370 can send a signal to the power control device 380 to allow (under direction of the appliance control system 320) the operation of the heating element of the oven. Conversely, when it is determined that the airflow rate is inadequate for the commanded fan speed, the airflow monitoring controller 370 can send a signal to the power control device 380 to disengage the heating element of the oven regardless of the directions/commands of the appliance control system 320.

During normal operations, that is when the airflow monitoring system 300 is operational and it has determined that the airflow rate is sufficient per the commanded fan speed, the appliance control system 320 can control the activation and disengagement of the appliance load based on normal operations of the appliance. However, in abnormal circumstances, that is when the airflow monitoring system 300 is not operational OR it has determined that the airflow rate is insufficient per the commanded fan speed, the airflow monitor system can override the appliance load activation commands of the appliance control system 320, and turn-off the subsystem of the appliance 390. Circuitry within the airflow monitoring system is designed to operate in a "fail safe" manner, meaning that if the airflow monitoring system 300 is not operational (functioning properly) the state of the power control device 380 is such that the controlled appliance subsystem 390 is deactivated.

As mentioned earlier, airflow monitoring controller 370 may be constructed using any combination of discrete or integrated analog and/or digital circuitry, including microprocessors executing software.

It should also be pointed-out that while power control device 380 is a relay in the exemplary embodiment, it could be replaced with any manner of power switching devices, including, but not limited to, solid state relays (SSRs), TRIACs, DIACs, transistors, etc.

Figure 4:
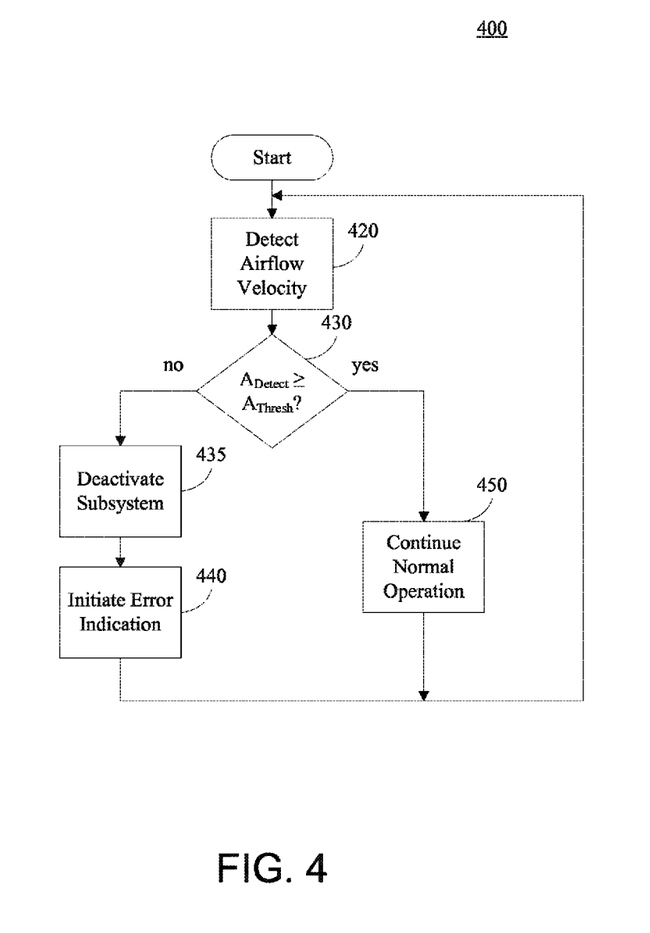
FIG. 4 provides a flow chart of a method of monitoring airflow according to an exemplary embodiment of the present disclosure.

FIG. 4 illustrates a flow chart of an exemplary method 400 according to an exemplary embodiment of the present disclosure. The method 400 will be discussed with reference to the exemplary airflow monitoring systems illustrated in FIGS. 3 and 6 through 10. However, the method 400 can be implemented with any suitable airflow monitoring system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

Airflow measuring device 360 within the airflow monitoring system 300 can detect the airflow velocity of the fan 330 in (420). Method 400 can be used with any type of fan, such as a single-speed fan or a multiple speed fan. The detected airflow velocity can be compared to a predetermined value such as a range of velocities or a specific velocity threshold value in (430). The predetermined range or value can be stored in the airflow monitor logic as a fixed value, look up table, or could be dynamically calculated using an equation or other algorithm. If the detected velocity is less than the predetermined range or threshold value, the airflow monitor controller 370 can deactivate a subsystem of the appliance in (435) via power control device 380 and initiate an error indication in (440). An error indication could include a visual and/or audio indication. When the detected velocity is greater than or equal to the predetermined range or threshold value, normal operation continues in (450). Following (440) and (450), method 400 can return to (420) and the airflow velocity can be detected one time, continuously, or for a predetermined number of times during an operational cycle of the appliance.

Figure 5:
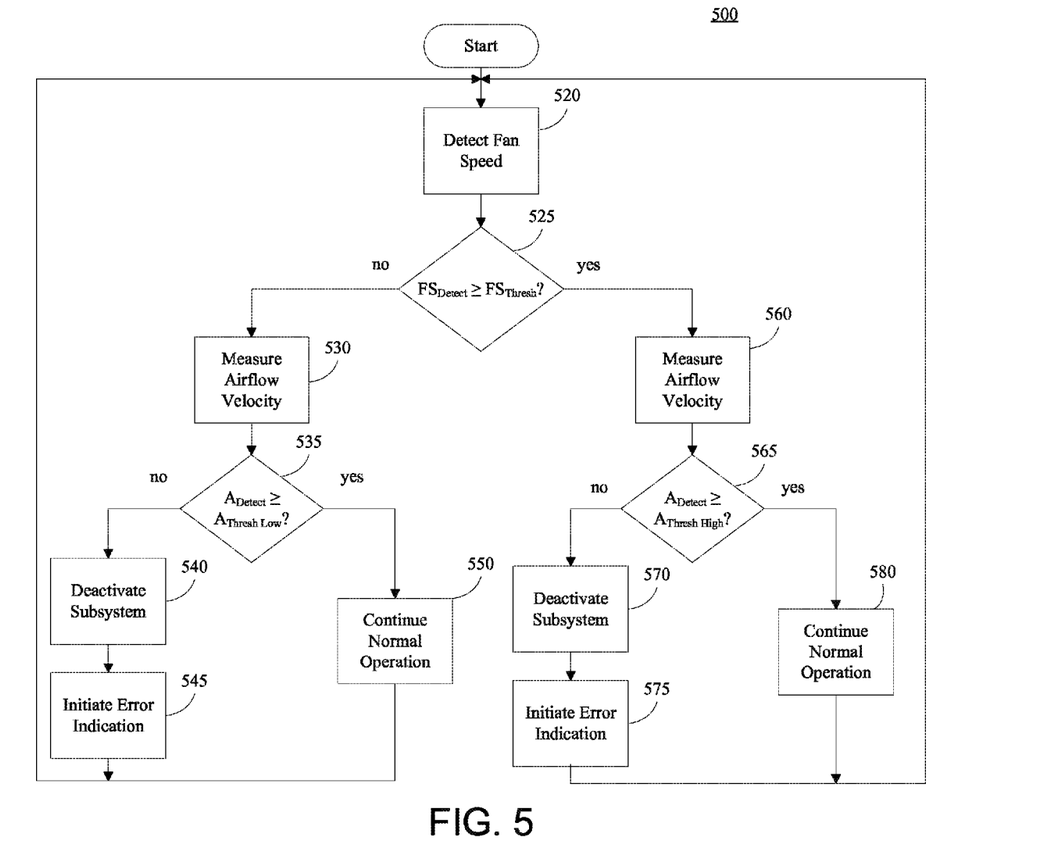
FIG. 5 provides a flow chart of a method of monitoring airflow according to an exemplary embodiment of the present disclosure.

FIG. 5 illustrates a flow chart of an exemplary method 500 according to an exemplary embodiment of the present disclosure. The method 500 will be discussed with reference to the exemplary airflow monitoring systems illustrated in FIGS. 3 and 6 through 10. However, the method 500 can be implemented with any suitable airflow monitoring system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

The fan may be commanded to operate at various fan speeds or a single fan speed. Fan speed detector 350 can detect the currently commanded fan speed in (520). For example, the fan can operate at a high speed and a low speed and the currently commanded speed is detected. The speed mode of the fan can be determined in (525) by comparing the detected fan speed with a predetermined fan speed. When a low fan speed mode is detected, the airflow velocity is measured in (530) by the airflow measuring device 360. The airflow controller 370 can determine whether the detected airflow velocity is within a predetermined velocity range or above a minimum threshold value in (535). If the detected airflow velocity is less than the predetermined velocity range or threshold value relative to the low fan speed mode, the airflow controller can deactivate the subsystem in (540) and initiate an error indication in (545). When the detected airflow velocity is greater than or equal to the predetermined velocity range or threshold value, the appliance continues normal operations in (550). When a high fan speed mode is detected, the airflow velocity is measured in (560).

The airflow controller 370 can determine whether the detected airflow velocity is within a predetermined velocity range or above a minimum threshold value in (565). If the detected airflow velocity is less than the predetermined velocity range or threshold value relative to the high fan speed mode, the airflow controller can deactivate the subsystem in (570) and initiate an error indication in (575). When the detected airflow velocity is greater than or equal to the predetermined velocity range or threshold value, the appliance continues normal operations in (580). Following (545), (550), (575), and (580), method 500 can return to (520) to detect the fan speed one time, continuously, or for a predetermined number of times during an operational cycle. Alternatively, following (545), (550), (575), and (580), method 500 can return to either (530) or (560) respectively after a commanded fan speed is determined.

Figure 6:
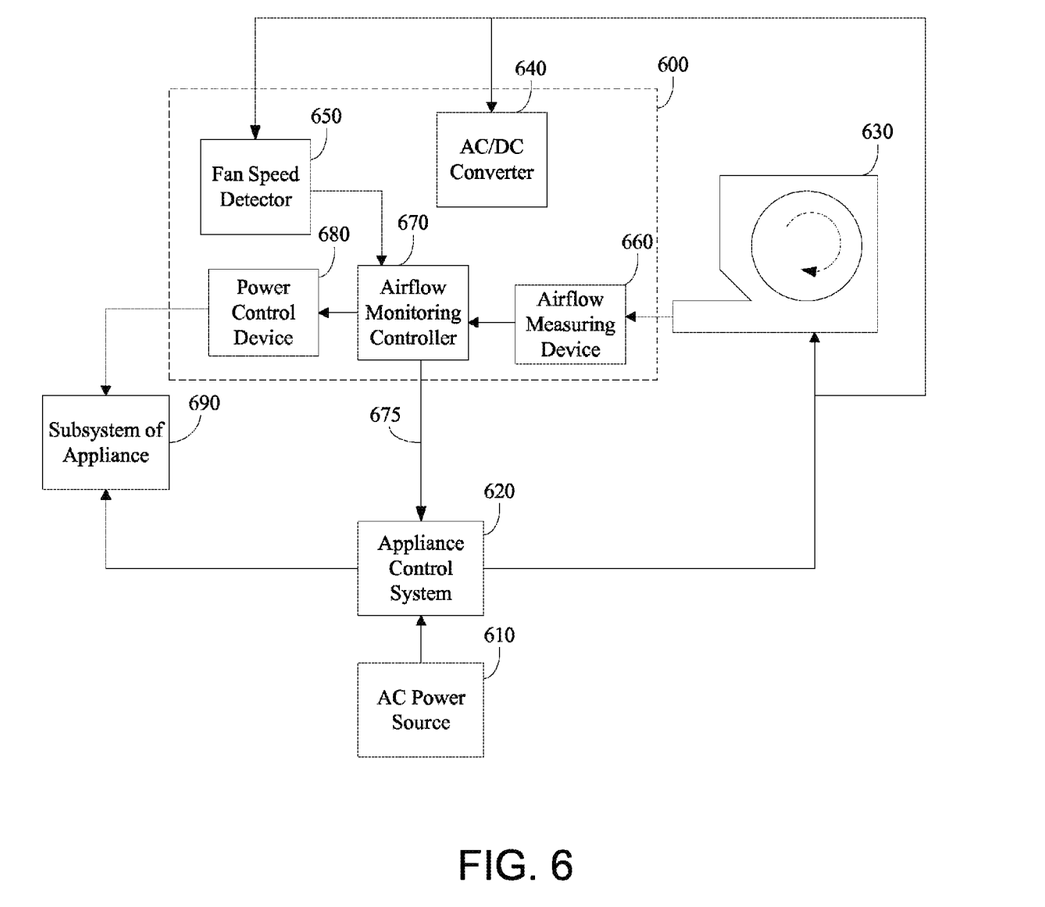
FIG. 6 provides a diagram of an exemplary airflow monitoring system according to an exemplary embodiment of the present disclosure.

FIG. 6 illustrates an exemplary embodiment of a schematic block diagram of an appliance including an airflow monitoring system 600. The topology of this embodiment is similar to FIG. 3 with the exception of an additional feedback signal 675 from the airflow monitoring controller 670 to the appliance control system 620. An alternating current (AC) power source 610 can provide power to the appliance control system 620. Alternatively, any other power sources can be used.

Appliance control system 620 can supply a power signal to the fan 630 to provide power and speed control to the fan 630. Fan 630 can operate at various speeds, such as high and low speeds. The power signal provides the fan 630 with a signal to command the fan to operate at the commanded speed for that portion of the appliance's operation cycle. Fan speed detector 650 and AC/DC converter 640 of the airflow detection system 600 can be coupled to the line supplying the AC power and control signal to the fan 630, and as such the airflow monitoring system 600 is powered by the signals which control the fan. The fan speed detector 650 detects the speed at which the fan 630 is commanded to operate and an AC/DC converter can use the fan's power signal to convert that signal into a DC signal to provide power to the airflow monitoring controller 670 and airflow measuring device 660. Fan speed detector 650 provides a signal that indicates the detected fan speed command to the airflow monitoring controller 670.

After the fan 630 begins operations, airflow measuring device 660 measures the velocity of the airflow from the fan 630 in an air passageway of the appliance. A signal is sent from the airflow measuring device 660 to the airflow monitoring controller 670 based on the measured airflow. When it is determined that the measured airflow rate is below a predetermined range or minimum threshold to provide adequate ventilation relative to the commanded fan speed, the airflow monitoring controller 670 sends a signal to the power control device 680 to disengage a subsystem of the appliance 690 (e.g. an appliance load) and sends a signal 675 to the appliance control system 620 to initiate error indicators such as a visual or audio indicator and/or a signal to discontinue all normal operations of the appliance.

Figure 7:
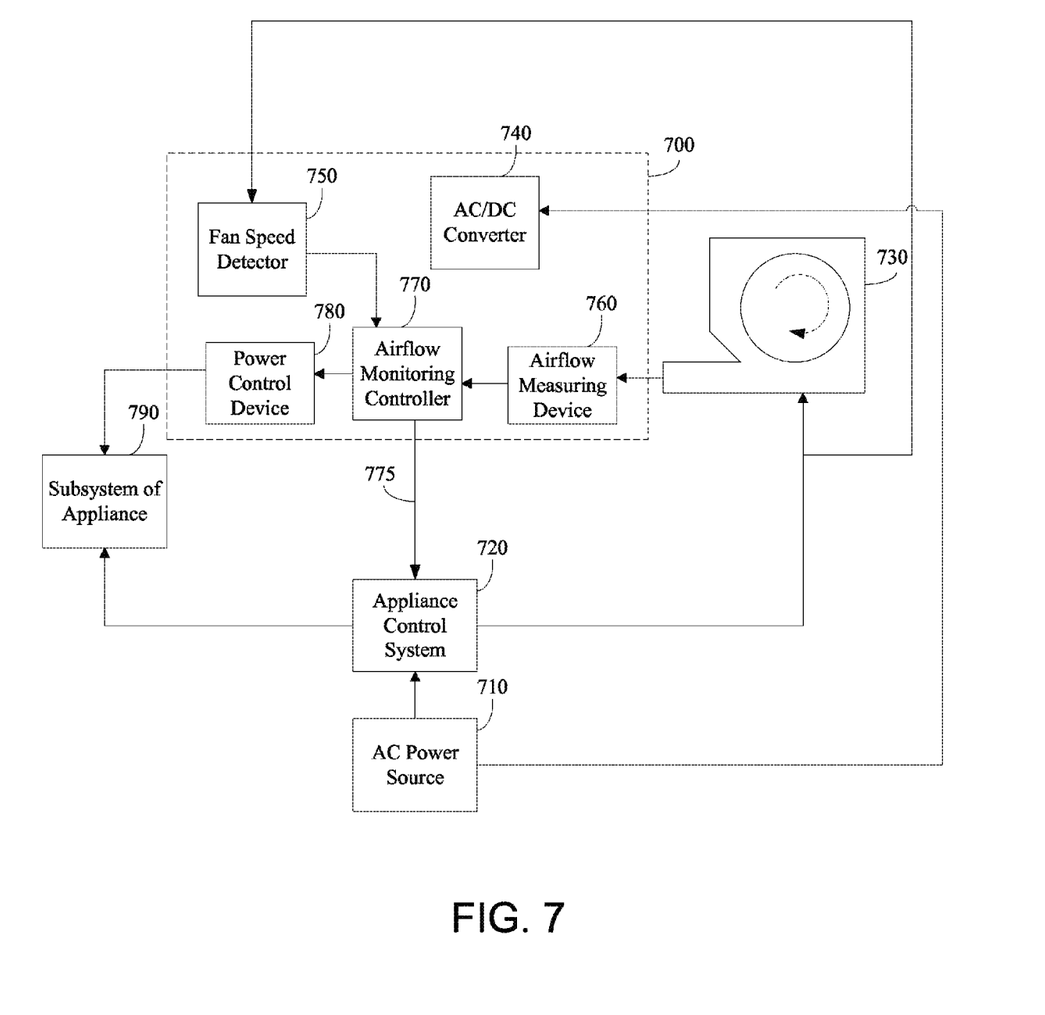
FIG. 7 provides a diagram of an exemplary airflow monitoring system according to an exemplary embodiment of the present disclosure.

As illustrated in FIG. 7, an exemplary embodiment of a schematic block diagram of an appliance including an airflow monitoring system 700 is provided. This implementation may be similar to that of FIG. 6 except that an alternating current (AC) power source 710 can provide power directly to the appliance control system 720 and the AC/DC converter 740 within the airflow monitoring system 700, rather than powering the airflow monitoring system 700 from the power/speed signals to the fan 730.

Appliance control system 720 can supply a power signal to the fan 730 to provide power and speed control signals to the fan 730. Fan 730 can operate at various speeds, such as high and low speeds. The power signal provides the fan 730 with a signal to indicate which speed to operate at for that portion of the appliance's operation cycle. Fan speed detector 750 can be coupled to the line supplying the AC power and control signal to the fan 730. The fan speed detector 750 detects the speed at which the fan 730 is commanded to operate. Fan speed detector 750 can provide a signal indicative of the detected fan speed command to the airflow monitoring controller 770. AC/DC converter 740 can use the power signal from AC power source 710 to convert the signal into a DC signal to provide power airflow monitoring controller 770 and airflow measuring device 760. After the fan 730 begins operations, airflow measuring device 760 measures the velocity of the airflow from the fan 730 in an air passageway of the appliance. A signal is sent from the airflow measuring device 760 to the airflow monitoring controller 770 based on the measured airflow rate. When it is determined that the monitored airflow rate is below a predetermined range or minimum threshold to provide adequate ventilation relative to the command fan speed, the airflow monitoring controller 770 sends a signal to the power relay 780 to disengage a subsystem of the appliance 790 (e.g. an appliance load) and a signal 775 to the appliance control system 720 to initiate error indicators such as a visual or audio indicator and/or a signal to discontinue all normal operations of the appliance.

Figure 8:
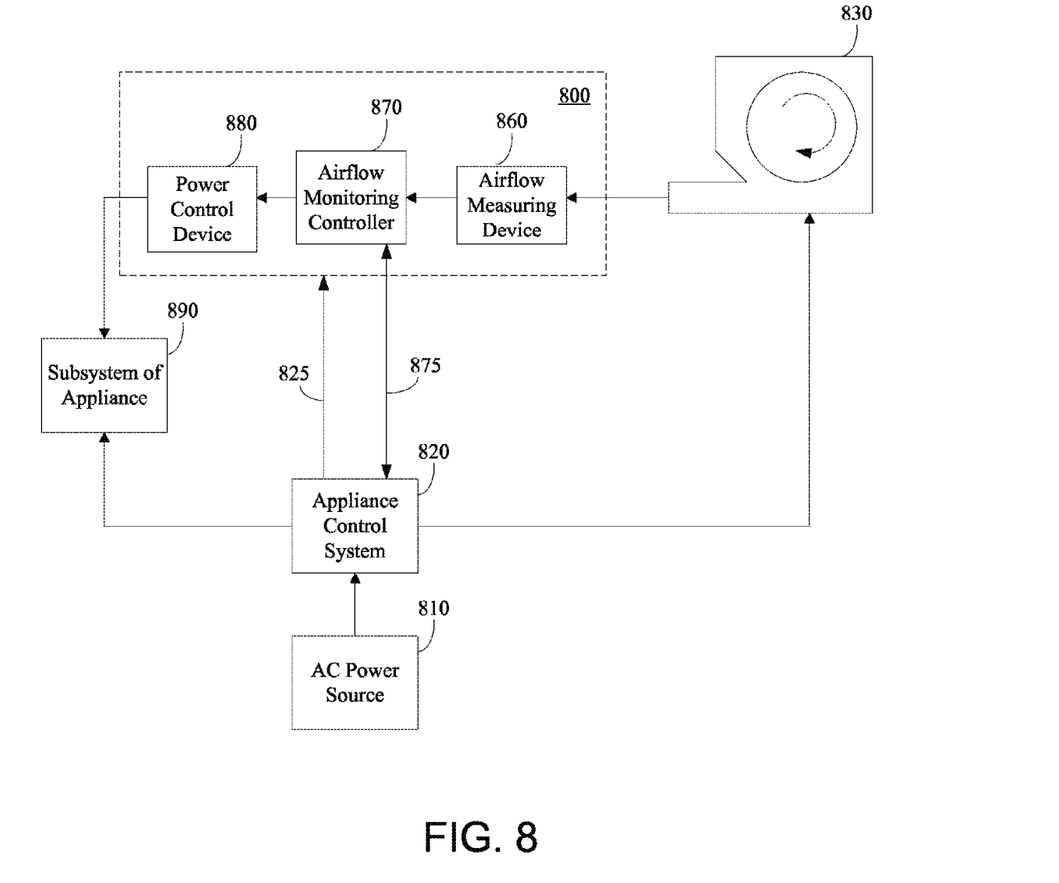
FIG. 8 provides a diagram of an exemplary airflow monitoring system according to an exemplary embodiment of the present disclosure.

FIG. 8 illustrates an exemplary embodiment of a schematic block diagram of an appliance including an airflow monitoring system 800. An AC power supply 810 supplies power to the appliance control system 820 which then provides power to fan 830 and the airflow monitoring system 800 via input 825. Appliance control system 820 controls normal operation of the appliance and communicates a signal indicative of the commanded fan speed to the airflow monitoring controller 870 via 875. The appliance control system 820 may include an AC/DC converter (not shown), where the power signal provided to the airflow monitoring system 800 is a DC signal.

After the fan 830 begins operations, airflow measuring device 860 measures the velocity of the airflow from the fan 830 in an air passageway of the appliance. A signal is sent from the airflow measuring device 860 to the airflow monitor controller 870 based on the measured airflow rate. A signal is sent from the appliance control system 820 to the airflow monitoring controller 870 via 875 indicative of the fan speed commanded or a minimum airflow rate in the appliance. When it is determined that the monitored airflow rate is below a predetermined range or minimum threshold value to provide adequate ventilation relative to the commanded fan speed, the airflow monitoring controller 870 sends a signal to the power control device 880 to disengage a subsystem of the appliance 890 (e.g. an appliance load) and sends a signal to the appliance control system 820 via output 875 to initiate error indicators such as a visual or audio indicator and/or a signal to discontinue all normal operations of the appliance.

Figure 9:
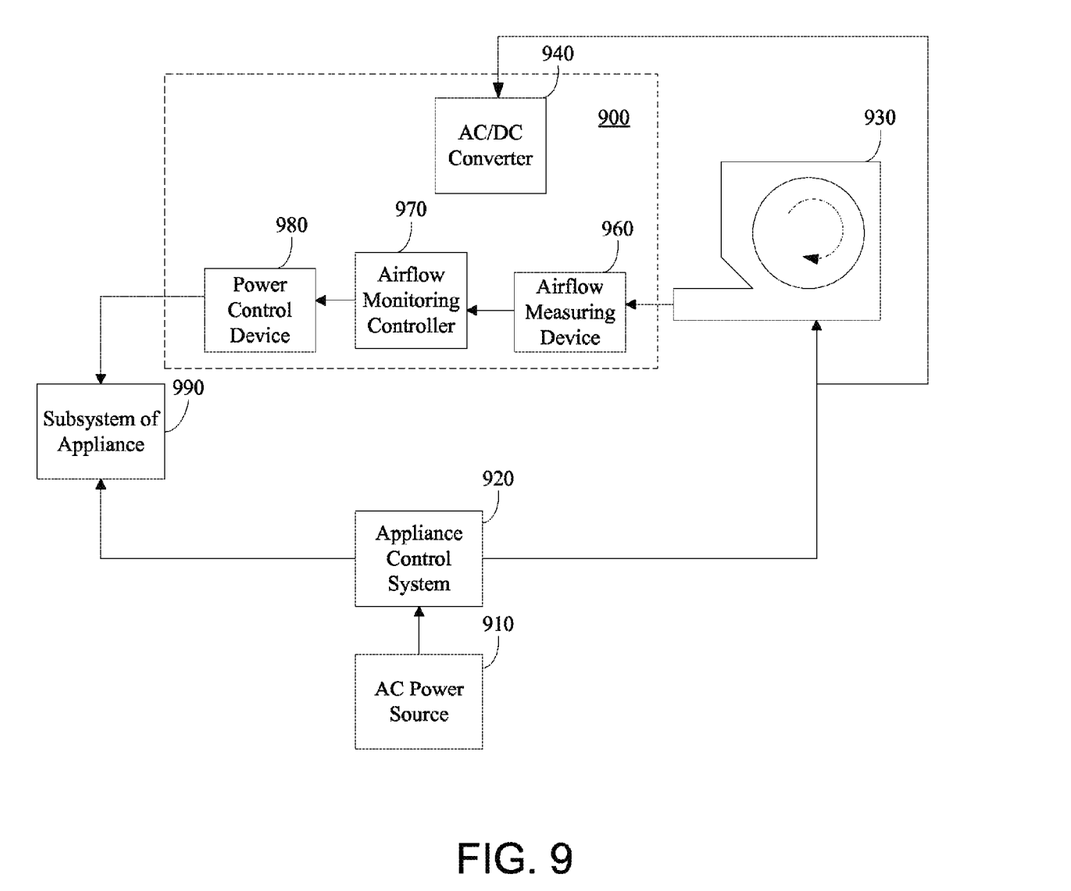
FIG. 9 provides a diagram of an exemplary airflow monitoring system according to an exemplary embodiment of the present disclosure.

With reference to FIG. 9, in an exemplary embodiment of a schematic block diagram of an appliance including an airflow monitoring system 900 for a single-speed fan is provided. An AC power source 910 provides power to the appliance control system 920 which in turn powers fan 930. In addition, AC/DC converter 940 can be connected to the fan power line from the appliance control system 920. AC/DC converter 940 can use the AC power supplied to the fan 930 and convert it to DC power signal that can be used to power airflow monitoring controller 970 and airflow measuring device 960. In this embodiment fan 930 has only a single speed so it is unnecessary to calculate or determine a plurality of adequate airflow rates.

After the fan 930 begins operations, airflow measuring device 960 measures the velocity of the airflow from the fan 930 in an air passageway. A signal is sent from the airflow measuring device 960 to the airflow monitor controller 970 based on the measured airflow rate. When it is determined that the measured airflow rate is below a range or minimum threshold value to provide adequate ventilation, the airflow monitoring controller 970 sends a signal to the power control device 980 to disengage a subsystem of the appliance 990 (e.g. an appliance load).

Figure 10:
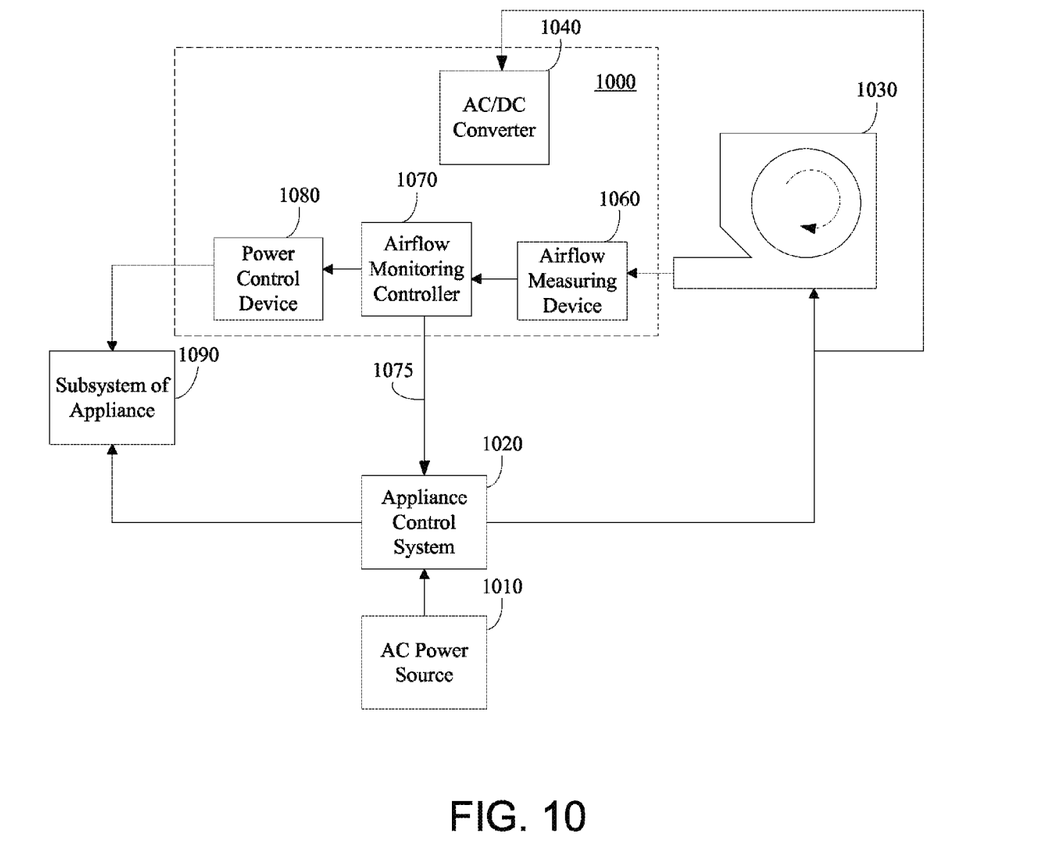
FIG. 10 provides a diagram of an exemplary airflow monitoring system according to an exemplary embodiment of the present disclosure.

As illustrated in FIG. 10, an exemplary embodiment of a schematic block diagram of an appliance including an airflow monitoring system 1000 is provided. An AC power source 1010 provides power to the appliance control system 1020 which in turn powers fan 1030. In addition, an AC/DC converter 1040 can be connected to the fan power line from the device controller 1020. The AC/DC converter can use an AC power supplied to the fan 1030 and convert it to a DC power signal that can be used to power the airflow monitoring system 1000. In this embodiment, fan 1030 has only a single speed so is unnecessary to calculate or determine a plurality of adequate airflow rates.

After the fan 1030 begins operations, airflow measuring device 1060 measures the velocity of the airflow from the fan 1030 in an air passageway. A signal is sent from the airflow measuring device 1060 to the airflow monitoring controller 1070 based on the measured airflow rate. When it is determined that the detected airflow rate is below a range or minimum threshold value to provide adequate ventilation, the airflow monitoring controller 1070 sends a signal to the power relay 1080 to disengage the subsystem of the appliance 1090 (e.g. an appliance load) and sends a signal to the appliance control system 1020 via output 1075 to initiate error indicators such as a visual or audio indicator and/or a signal to discontinue all normal operations of the appliance.

For any or all of the above described exemplary embodiments, an operational mode can be implemented numerous ways. For example, an input may be received at interface from a user indicative of an initiation of a desired operational mode. The appliance control system can initiate at least one of a plurality of subsystems of the appliance such as in an oven activating a heater to reach a desired temperature indicated by the user. The airflow monitoring system may be in an inactive state until the fan is initiated during the operational mode. Alternatively, the airflow monitoring system may be actively monitoring following the input from the user. In an alternative exemplary embodiment, the power relay of the airflow monitoring system can be in a state that prevents operation of the appliance load. When the power relay is in a state that prevents operation of an appliance load (i.e. the appliance load is in a deactivate state), the appliance load cannot be activated by the appliance control system until the airflow monitoring system determines that the airflow rate is sufficient for the corresponding operational speed of the fan.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
   an ambient air passageway defined in the appliance, the ambient air passageway configured to direct circulating ambient air around at least part of a chamber of the appliance;
   a fan in communication with the ambient air passageway, the fan configured to selectively cause the ambient air to circulate through the ambient air passageway;
   an appliance control system configured to control a speed of the fan based on an operating mode of the appliance; and
   an airflow monitoring system in communication with the ambient air passageway, the airflow monitoring system configured to autonomously control a subsystem of the appliance based on a measured airflow rate within the ambient air passageway, the airflow monitoring system including
      an airflow measuring device disposed at least partly within the ambient air passageway, the airflow measuring device configured to measure air velocity and determine the measured airflow rate through the ambient air passageway, and
      an airflow monitoring controller configured to control the subsystem of the appliance based on the measured airflow rate by the airflow measuring device and compare the measured airflow rate by the airflow measuring device with a dynamic predetermined value of airflow velocity, where the dynamic predetermined value is dynamically determined according to a commanded fan speed;
   wherein the appliance control system and the airflow monitoring system are both operably coupled to the subsystem of the appliance.

2. An appliance as in claim 1, wherein the fan includes a multiple speed fan.

3. An appliance as in claim 1, wherein the airflow monitoring controller is further configured to
   control the subsystem of the appliance based on whether the measured airflow rate is less than or greater than the predetermined value.

4. An appliance as in claim 3, wherein the airflow monitoring controller, upon determining that the measured airflow rate is less than the predetermined value, produces at least one of a visual indication signal, an audio indication signal, and an error signal to the appliance control system indicating that the measured airflow rate is less than the predetermined value.

5. An appliance as in claim 4, wherein the error signal provided to the appliance control system indicating whether the measured airflow rate is less than the predetermined value causes the appliance control system to initiate at least one of a visual indicator, an audio indicator, and deactivation of power to at least a subsystem of the appliance.

6. An appliance as in claim 1, wherein the commanded fan speed is provided to the airflow monitoring system by the appliance control system.

7. An appliance as in claim 1, wherein the airflow monitoring system further comprises a fan speed detector in communication with the power signal to the fan, and the airflow monitoring system determines the commanded fan speed based on an output of the fan speed detector.

8. An appliance as in claim 1, wherein the airflow monitoring system further comprises a power control device and the power control device controls the subsystem of the appliance based on the measured airflow rate by the airflow measuring device.

9. An appliance as in claim 8, wherein the power control device disengages the subsystem of the appliance if the measured airflow rate by the airflow measuring device is less than the predetermined value.

10. An appliance as in claim 1, wherein the airflow monitoring system is disposed separately from the appliance control system within the appliance.

11. A method for controlling one or more subsystems of an appliance based on a measured airflow rate around at least part of a chamber of the appliance, comprising
   monitoring the measured airflow rate circulating through an ambient air passageway at an airflow monitoring system, where a fan circulates ambient air through the ambient air passageway at the measured airflow rate based on commands from an appliance control system according to an appliance operating mode, including determining the measured airflow rate at an airflow measuring device and comparing the measured airflow rate by the airflow measuring device with a dynamic predetermined value of airflow velocity, where the dynamic predetermined value is dynamically determined according to a commanded fan speed; and
   autonomously controlling a the one or more subsystems of the appliance based on the measured airflow rate using the airflow monitoring system,
      wherein the appliance control system and the airflow monitoring system are both operably coupled to the one or more subsystems of the appliance.

12. A method as in claim 11, wherein monitoring the measured airflow rate circulating through the ambient air passageway at the airflow monitoring system comprises:
   determining a speed the fan is operating at to circulate ambient air through the ambient air passageway; and
   communicating the measured airflow rate and the fan speed to an airflow monitoring controller.

13. A method as in claim 12, wherein determining the speed the fan is operating at to circulate ambient air through the ambient air passageway comprises receiving a commanded fan speed signal at the airflow monitoring system from the appliance control system.

14. A method as in claim 12, wherein determining the speed the fan is operating at to circulate ambient air through the ambient air passageway comprises detecting a fan speed at the airflow monitoring system using a fan speed detector.

15. A method as in claim 12, wherein controlling the appliance based on the measured airflow rate using the airflow monitoring system comprises:
   controlling the appliance when the measured airflow rate is less than the predetermined value.

16. A method as in claim 15, wherein controlling the appliance when the measured airflow rate is less than the predetermined value comprises deactivating the one or more subsystems of the appliance using a power control device.

17. A method as in claim 11, wherein the predetermined value is based on a speed of the fan.

18. A method as in claim 11, further comprising initiating an error indication based on the measured airflow rate.

19. A method as in claim 18, wherein initiating an error indication based on the measured airflow rate comprises sending an error signal from the airflow monitoring system to the appliance control system when the measured airflow rate is less than a predetermined value; and initiating a remedial action at the appliance control system after the appliance control system receives the error signal.

20. A method as in claim 19, wherein initiating a remedial action at the appliance control system comprises initiating at least one of a visual indicator, an audio indicator, and deactivation of power to at least part of the appliance.

\* \* \* \* \*